(12) United States Patent
Bull et al.

(10) Patent No.: US 10,498,659 B2
(45) Date of Patent: Dec. 3, 2019

(54) SYSTEM AND METHOD FOR MANAGING VIRTUAL RADIO ACCESS NETWORK SLICING

(71) Applicant: CISCO TECHNOLOGY, INC., San Jose, CA (US)

(72) Inventors: Oliver James Bull, Bristol (GB); Mark Grayson, Maidenhead (GB)

(73) Assignee: CISCO Technology, INC., San Jose, CA (US)

( * ) Notice: Subject to any disclaimer, the term of this patent is extended or adjusted under 35 U.S.C. 154(b) by 102 days.

(21) Appl. No.: 15/203,609

(22) Filed: Jul. 6, 2016

(65) Prior Publication Data

US 2018/0013680 A1    Jan. 11, 2018

(51) Int. Cl.
*H04L 12/819*    (2013.01)
*H04W 72/12*    (2009.01)
(Continued)

(52) U.S. Cl.
CPC ........... *H04L 47/215* (2013.01); *H04W 16/14* (2013.01); *H04W 72/1268* (2013.01);
(Continued)

(58) Field of Classification Search
None
See application file for complete search history.

(56) References Cited

U.S. PATENT DOCUMENTS

| 8,983,475 B2 | 3/2015 | Gopalakrishnan | |
| 2011/0176424 A1* | 7/2011 | Yang | H04L 41/0803 370/236.2 |

(Continued)

FOREIGN PATENT DOCUMENTS

WO    WO2014/077753    5/2014

OTHER PUBLICATIONS

"ETSI TS 123 401 V13.6.1 (May 2016) Technical Specification: LTE; General Packet Radio Service (GPRS) enhancements for Evolved Universal Terrestrial Radio Access Network (E-UTRAN) access (3GPP TS 23.401 version 13.6.1 Release 13)," ETSI, 650 Route des Lucioles F-06921 Sophia Antipolis Cedex—France, May 2016; 367 pages.

(Continued)

*Primary Examiner* — Gregory B Sefcheck
*Assistant Examiner* — Jenkey Van
(74) *Attorney, Agent, or Firm* — Patterson + Sheridan, LLP

(57) ABSTRACT

A method is provided in one example embodiment and may include configuring a slice identity for each of a plurality of virtual radio access network (vRAN) slices, wherein each vRAN slice comprises functionality to perform, at least in part, one or more radio protocol operations on subscriber traffic; configuring an allotment of radio resources that can be utilized by each vRAN slice of the plurality of vRAN slices; receiving, by a slice manager, a subscriber profile identity (SPID) for a subscriber; and mapping the SPID for the subscriber to a particular vRAN slice of the plurality of vRAN slices. The method can further include communicating the mapping for the subscriber to the particular vRAN slice to which the SPID is mapped. The method can further include communicating the allotment of radio resources that can be utilized by the particular vRAN slice to the particular vRAN slice.

20 Claims, 8 Drawing Sheets

(51) Int. Cl.
*H04W 16/14* (2009.01)
*H04W 8/18* (2009.01)
*H04W 88/08* (2009.01)

(52) U.S. Cl.
CPC .......... *H04W 72/1273* (2013.01); *H04W 8/18* (2013.01); *H04W 88/08* (2013.01)

(56) References Cited

U.S. PATENT DOCUMENTS

| | | | |
|---|---|---|---|
| 2012/0039204 A1* | 2/2012 | Gao | H04W 72/0486 370/252 |
| 2013/0094486 A1 | 4/2013 | Bhanage et al. | |
| 2013/0267229 A1* | 10/2013 | Gopalakrishnan | H04W 36/0061 455/436 |
| 2014/0086177 A1* | 3/2014 | Adjakple | H04W 12/08 370/329 |
| 2014/0126474 A1 | 5/2014 | Eriksson et al. | |
| 2014/0162669 A1* | 6/2014 | Dahlen | H04W 72/0453 455/450 |
| 2014/0233479 A1 | 8/2014 | Dahod et al. | |
| 2016/0127169 A1 | 5/2016 | Rosa de Sousa Teixeira et al. | |
| 2017/0070892 A1* | 3/2017 | Song | H04W 16/18 |
| 2017/0164349 A1* | 6/2017 | Zhu | H04W 28/0247 |
| 2017/0201968 A1* | 7/2017 | Nam | H04W 72/042 |
| 2017/0257860 A1* | 9/2017 | Nam | H04W 72/0413 |
| 2017/0339567 A1* | 11/2017 | Li | H04W 16/02 |

OTHER PUBLICATIONS

"ETSI TS 125 331 V13.2.0 (Apr. 2016) Technical Specification: Universal Mobile Telecommunications System (UMTS); Radio Resource Control (RRC); Protocol specification (3GPP TS 25.331 version 13.2.0 Release 13)," ETSI, 650 Route des Lucioles F-06921 Sophia Antipolis Cedex—France, 2294 pages.

"ETSI TS 125 401 V13.0.0 (Jan. 2016) Technical Specification: Universal Mobile Telecommunications Systems (UMTS); UTRAN overall description (3GPP TS 25.401 version 13.0.0 Release 13)," ETSI, 650 Route des Lucioles F-06921 Sophia Antipolis Cedex—France, 66 pages.

"ETSI TS 125 413 V13.0.1 (May 2016) Technical Specification: Universal Mobile Telecommunications System (UMTS); UTRAN Iu interface Radio Access Network Application Part (RANAP) signaling (3GPP TS 25.413 version 13.1.0 Release 13)," ETSI, 650 Route des Lucioles F-06921 Sophia Antipolis Cedex—France, May 2016; 442 pages.

"ETSI TS 129 272 V13.5.1 (May 2016) Technical Specification: Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 version 13.5.1 Release 13)," ETSI, 650 Route des Lucioles F-06921 Sophia Antipolis Cedex—France, May 2016; 154 pages.

"ETSI TS 129 060 (V13.4.0 (Apr. 2016) Technical Specification: Digital cellular telecommunications system (Phase 2+) (GSM); Universal Mobile Telecommunications System (UMTS); General Packet Radio Service (GPRS); GPRS Tunnelling Protocol (GTP) across the Gn and the Gp interface (3GPP TS 29.060 version 13.4.0 Release 13)," ETSI, 650 Route des Lucioles F-06921 Sophia Antipolis Cedex—France, Jun. 2016; 188 pages.

Written Opinion of the International Searching Authority for Application No. PCT/US2017/038766 dated Oct. 23, 2017.

\* cited by examiner

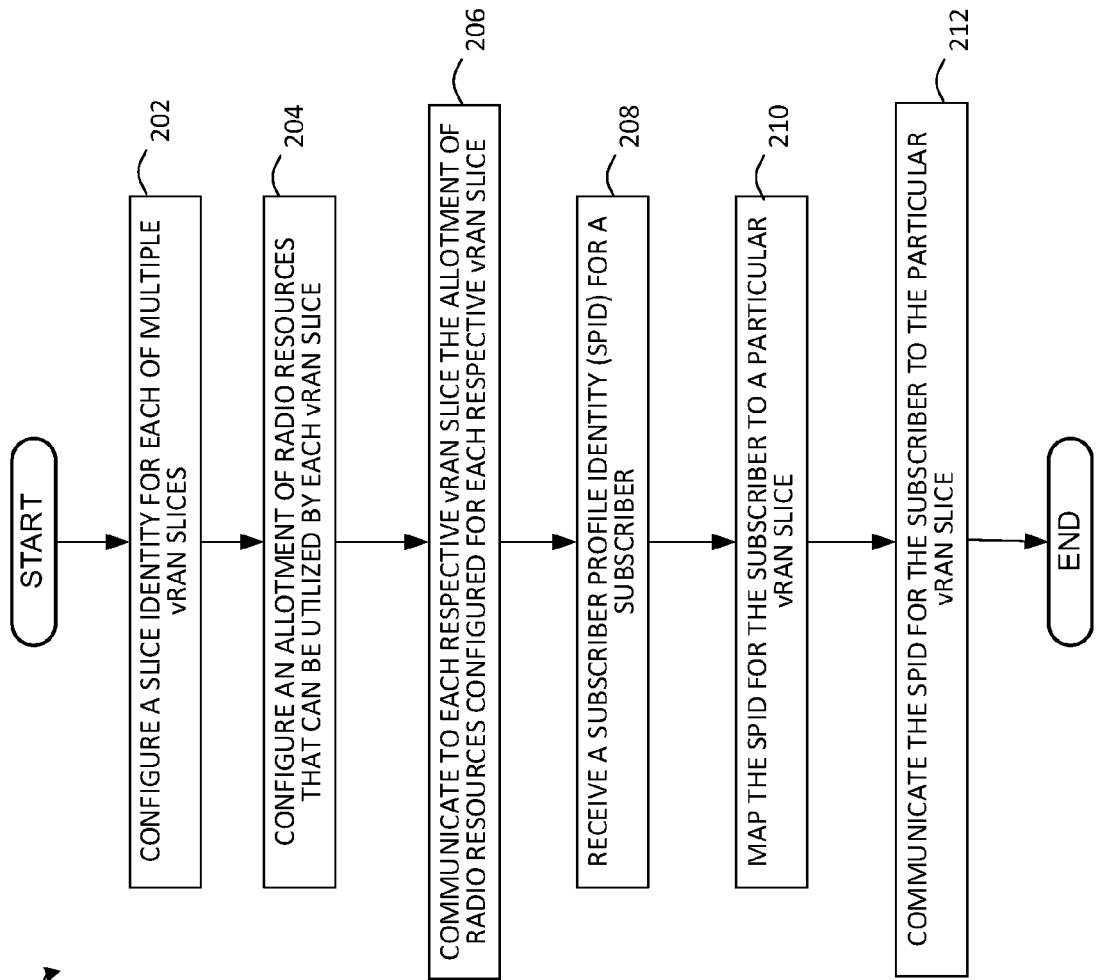

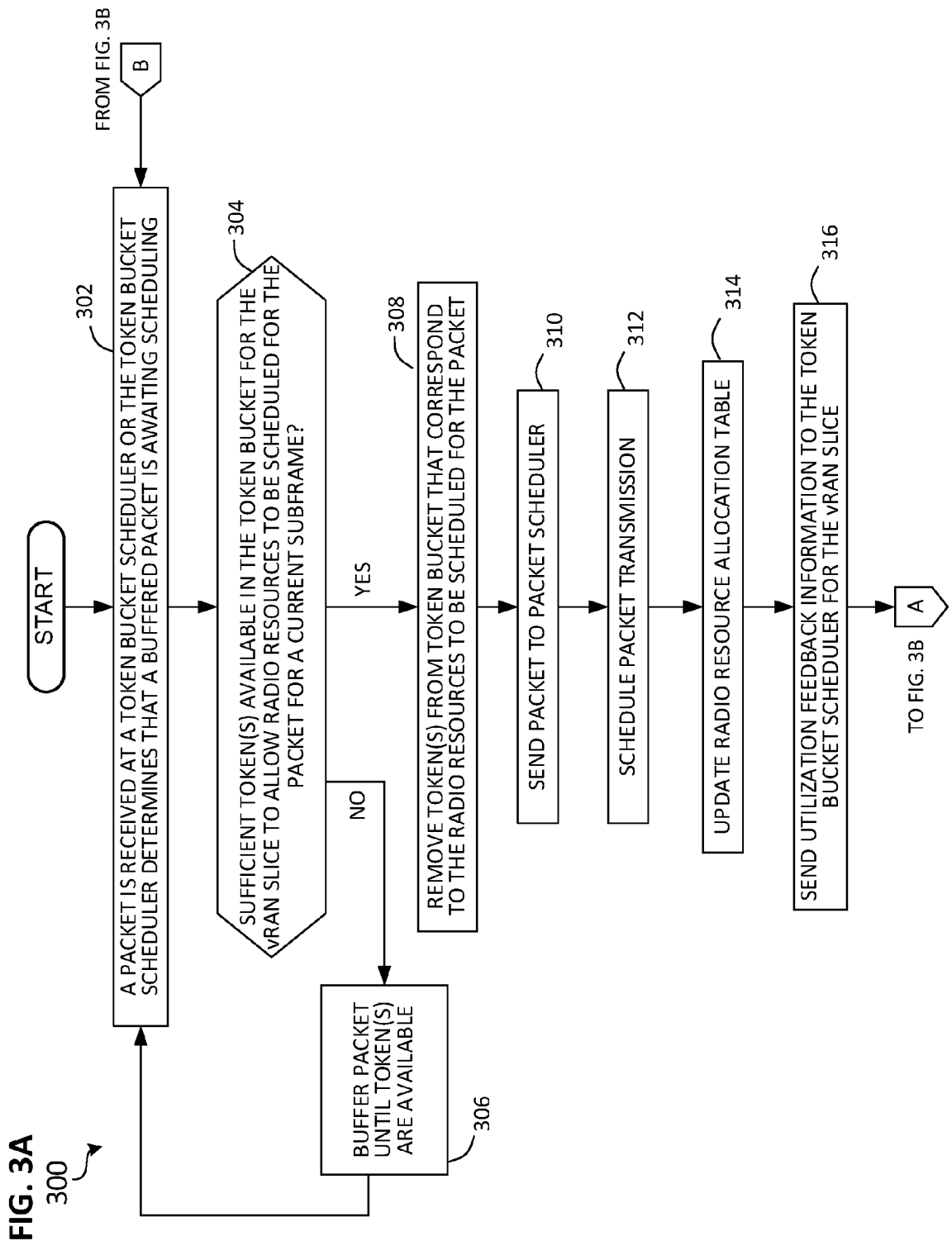

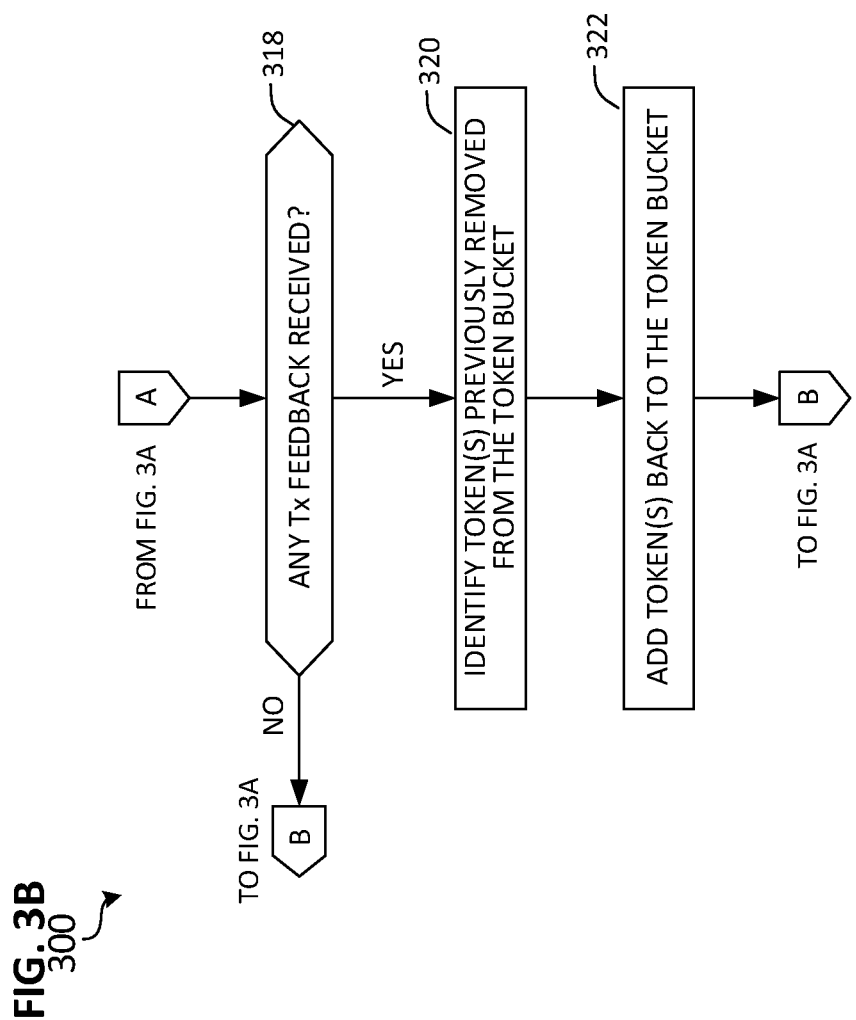

SYSTEM AND METHOD FOR MANAGING VIRTUAL RADIO ACCESS NETWORK SLICING

TECHNICAL FIELD

This disclosure relates in general to the field of communications and, more particularly, to a system and method for managing virtual Radio Access Network (vRAN) slicing.

BACKGROUND

Networking architectures have grown increasingly complex in communication environments. Mobile communication networks have grown substantially in subscriber base as end users become increasingly connected to mobile wireless environments. As the number of mobile subscribers increases, efficient management of communication resources becomes more critical. In some instances, network service providers desire to manage RAN functionality across a communication system through a virtualized architecture. In a virtualized architecture, multiple instantiations or 'slices' of certain vRAN functionality can be instantiated for one or more access networks. However, there are significant challenges in managing resources for vRAN slices to maintain subscriber persistency when multiple vRAN slices are instantiated for a communication system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified flow diagram illustrating example operations that can be associated with managing vRAN slicing in accordance with one potential embodiment;

FIGS. 3A-3B are a simplified flow diagram illustrating example operations that can be associated with handling subscriber traffic by a vRAN slice in accordance with one potential embodiment;

DETAILED DESCRIPTION OF EXAMPLE EMBODIMENTS

Overview

Figure 1:
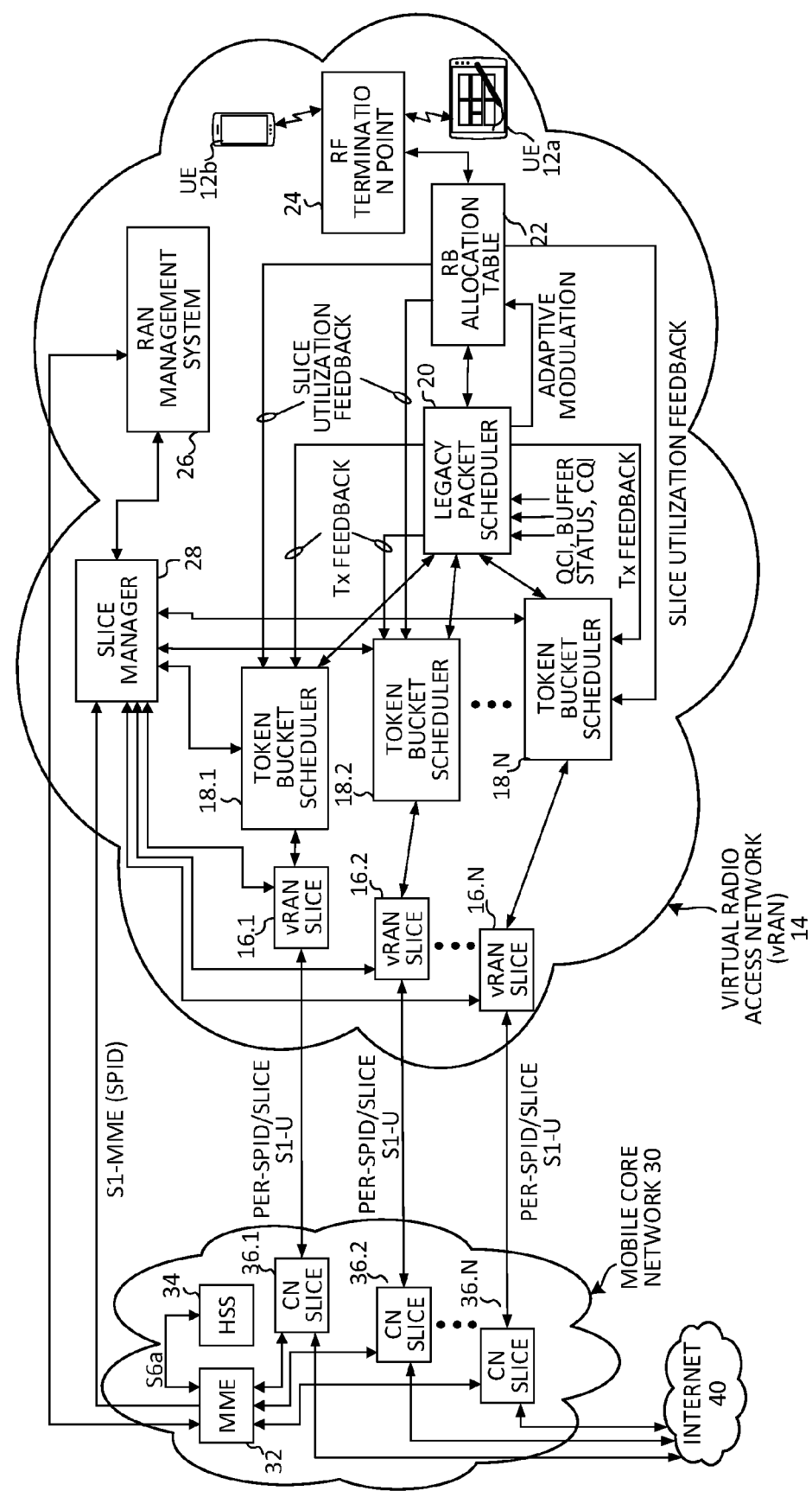
FIG. 1 is a simplified block diagram illustrating example details associated with a communication system to facilitate managing vRAN slicing according to one embodiment of the present disclosure.

A method is provided in one example embodiment and may include configuring a slice identity for each of a plurality of virtual radio access network (vRAN) slices, wherein each vRAN slice comprises functionality to perform, at least in part, one or more radio protocol operations on subscriber traffic; configuring an allotment of radio resources that can be utilized by each vRAN slice of the plurality of vRAN slices; receiving, by a slice manager, a subscriber profile identity (SPID) for a subscriber; and mapping the SPID for the subscriber to a particular vRAN slice of the plurality of vRAN slices.

In one instance, the method can further include communicating the mapping for the subscriber to the particular vRAN slice to which the SPID is mapped. In one instance, the method can further include communicating the allotment of radio resources that can be utilized by the particular vRAN slice to the particular vRAN slice. In one instance, the method can further include storing, by the slice manager, an association of the SPID for the subscriber with the slice identity for the particular vRAN slice based on the mapping.

In some cases, configuring the allotment of radio resources that can be utilized by each vRAN slice of the plurality of vRAN slices can include: determining a total number of physical resource blocks that can be scheduled within a subframe; and configuring an amount of physical resource blocks that can be scheduled by each vRAN slice of the plurality of vRAN slices based on the total number of physical resource blocks that can be scheduled within a subframe. In one instance, the total number of physical resource blocks that can be scheduled within a subframe can be associated with at least one of: downlink transmissions for one or more subscribers; and uplink transmissions for one or more subscribers.

In still some cases, the method can further include configuring a token bucket for each vRAN slice of the plurality of vRAN slices, wherein each token bucket for each vRAN slice is configured with a number of tokens that is based on the allotment of radio resources configured for each vRAN slice; and maintaining for each vRAN slice a token count representing a number radio resources allocated to subscriber traffic operated on by each vRAN slice.

In still some cases, the method can further include receiving, by at least one vRAN slice, utilization feedback information indicating an amount of radio resources utilized by the at least one vRAN slice in relation to a total number of radio resources that can be utilized by the plurality of vRAN slices for a subframe. In still some cases, the method can further include updating, for the at least one vRAN slice, the number of tokens of the token bucket configured for the vRAN slice based on the utilization feedback information received by the at least one vRAN slice.

The one or more radio protocol operations can include at least one of: one or more Packet Data Convergence Protocol (PDCP) operations; one or more Radio Link Control (RLC) operations; and one or more Medium Access Control (MAC) operations. In some instances, each vRAN slice of the plurality of vRAN slices can further include functionality to perform Radio Resource Control (RRC) operations on subscriber traffic.

Example Embodiments

As referred to herein in this Specification, the terms: 'virtual', 'virtual machine', 'virtualized network function', 'virtualized network functionality', 'virtual network function' and variations thereof can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), virtualized functionality and/or any virtualized network controller, module, aggregator, combinations thereof or the like as described herein may execute via a hypervisor-based virtualization or a container-based virtualization of a compute node (e.g., blade server, rack server, stand-alone server) using the compute node's hardware (e.g., processor and memory element) and/or operating system for a given virtualized network environment.

In some cases, VNF(s) can be configured to perform one or more specialized operations within a network environment and one or more instances of the configured VNF(s) can be instantiated in order to execute the one or more specialized operations. In some instances, VNF(s) can include one of more virtualized network function components (VNFCs). In some embodiments, a VNFC can be an internal component of a VNF, which can provide a VNF provider a defined subset of that VNF's functionality via a VNFC instance (VNFCI). In some embodiments, operations or functionality associated with a RAN can be configured to be executed via one or more VNFs and/or VNFCs and/or one or more Physical Network Functions (PNFs) to realize a virtual RAN (vRAN) architecture. A PNF is typically associated with a hardware radio head, which can be configured with one or more transmitters and receivers (and other associated hardware and software functionality) in order to facilitate over-the-air (OTA) Radio Frequency (RF) communications with one or more user equipment (UE).

Architectures that facilitate network communications generally rely upon three basic components: a data-plane, a control-plane, and a management-plane. The data-plane carries user traffic, while the control-plane and the management-plane serve the data-plane. As referred to herein in this Specification, the term 'plane' can refer to a separation of traffic that can traverse a network. As referred to herein in this Specification, the terms 'user-plane', 'data-plane' and 'user data-plane' can be used interchangeably.

Different logical separations or 'decompositions' (sometimes referred to as a 'logical decompositions') of VNFs/VNFCs/VNFCIs can be configured for different possible vRAN architectures. For a given vRAN architecture, each configured VNF/VNFC/VNFCI can perform certain specialized operations or functionality among one or more virtualized network element(s), scheduler(s), controller(s), module(s), aggregator(s), combinations thereof or any other network element that may be associated with the vRAN architecture. A given vRAN architecture can be realized, in an operational sense, by instantiating VNFs/VNFCs/VNF-CIs associated with the vRAN architecture at runtime, power-up, initialization, dynamically based on load, etc. for one or more servers, etc. in order to execute the specialized operations as configured for the VNFs/VNFCs/VNFCIs. As referred to herein a particular separation or decomposition of VNFs/VNFCs/VNFCIs, which can provide various vRAN functionality for a given vRAN implementation can be referred to as a 'slice', which can be instantiated multiple times for a vRAN, often dynamically, based on load, network congestion, equipment failure, processing bandwidth or constraints, memory bandwidth or constraints, RAN interference, combinations thereof or the like.

Turning to FIG. 1, FIG. 1 is a simplified block diagram illustrating a communication system 10 to facilitate managing vRAN slicing according to one embodiment of the present disclosure. In one embodiment, the particular configuration shown in FIG. 1 may be tied to the 3rd Generation Partnership Project (3GPP) Evolved Universal Mobile Telecommunications System (UMTS) Terrestrial Radio Access Network (E-UTRAN) architecture, which can interface with a Long Term Evolution (LTE) Evolved Packet System (EPS) core. Alternatively, the depicted architecture may be applicable to other environments equally.

The example architecture of communication system 10 shown in the embodiment of FIG. 1 may include one or more users operating user equipment (UE) 12a-12b, a virtual Radio Access Network (vRAN) 14, a number 'N' of vRAN slices including: a first vRAN slice 16.1, a second vRAN slice 16.2 and an Nth vRAN slice 16.N, a number of token bucket schedulers including a first token bucket scheduler 18.1, a second token bucket scheduler 18.2 and an Nth token bucket scheduler 18.N, a legacy packet scheduler 20, a resource block (RB) allocation table 22, a Radio Frequency (RF) termination point 24, a RAN management system (RMS) 26, a slice manager 28, a mobile core network 30 and an internet 40. Mobile core network 30 can include a Mobility Management Entity (MME) 32, a Home Subscriber Server (HSS) 34 and a number of core network (CN) slices 36.1-36.N.

Each respective vRAN slice 16.1-16.N can interface with each respective CN slice 36.1-36.N within mobile core network 30. Slice manager 28 can interface with: MME 32, RAN management system 26, each vRAN slice 16.1-16.N and each token bucket scheduler 18.1-18.N. MME 32 can interface with: slice manager 28 via an S1-MME interface, RAN management system 26, HSS via a 3GPP S6a interface, and each CN slice 36.1-36.N. In at least one embodiment, the interface between MME 32 and each CN slice 36.1-36.N can include, but not be limited to, a 3GPP S11 interface.

Each respective vRAN slice 16.1-16.N can further interface with a respective token bucket scheduler 18.1-18.N. Each token bucket scheduler can further interface with legacy packet scheduler 20, which can further interface with RB allocation table 22. RB allocation table can interface with each token bucket scheduler 18.1-18.N and with RF termination point 24, which may further interface with each UE 12a-12b via an over-the-air (OTA) interface. In some embodiments, RB allocation table 22 can be implemented as part of legacy packet scheduler 20.

Each of the elements of FIG. 1 may couple to one another through the simple interfaces (as illustrated) or through any other suitable connection (wired or wireless), which provides a viable pathway for network communications. Additionally, any one or more of these elements may be combined or removed from the architecture based on particular configuration needs. In some embodiments, communications in a network environment can be facilitated through the exchange of packets. A packet is a formatted unit of data and can contain both control information (e.g., source and destination address, etc.) and data, which is also known as payload. Network traffic can be sent and received according to any suitable communication messaging protocols. Suitable communication messaging protocols can include a multi-layered scheme such as the Open Systems Interconnection (OSI) Model, or any derivations or variants thereof. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs. Communications in a network environment are referred to herein as 'messages', 'messaging' and/or 'signaling', which may be inclusive of communications using packets.

Other protocols or interfaces that can be used in communication system 10 can include 3GPP Diameter-based protocols, a remote authentication dial in user service (RADIUS) protocol, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc. The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Although only two UE (e.g., UE 12a-12b) are illustrated in the embodiment of FIG. 1, it should be understood that any number of UEs can be present within vRAN 14. As described in further detail herein, other network elements may be present within communication system 10 according to various embodiments of the present disclosure. For various embodiments described herein, the '(s)' nomenclature is used to indicate 'one or more'.

In general, vRAN 14 may provide a communications interface between UE 12a-12b and mobile core network 30 for one or more 3GPP Internet protocol (IP) access networks. In various embodiments, 3GPP access networks can include a Global System for Mobile Communications (GSM) Enhanced Data Rates for GSM (EDGE) radio access network (GERAN), a Universal Mobile Telecommunications System (UMTS) Terrestrial radio access network (UTRAN), generally referred to as 3rd Generation (3G), a LTE access network such as evolved UTRAN (E-UTRAN), generally referred to as 4th Generation (4G) or LTE/LTE-Advanced (LTE-A), and/or a 5th Generation (5G) access network.

In various embodiments, vRAN 14 can include one or more VNFs/VNFCs/VNFCIs, which can provide vRAN functionality across vRAN slices 16.1-16.N, token bucket schedulers 18.1-18.N, legacy packet scheduler 20, RB allocation table 22 and/or RF termination point 24, depending on the vRAN logical function decomposition that may be implemented for vRAN 14. As referred to herein in this Specification, VNFs, VNFCs and VNFCIs can be referred to generally as VNFs. In various embodiments, VNFs configured for various vRAN 14 logical function decompositions can include either separated instances or combined instances of: Radio Resource Management (RRM) functionality, Radio Resource Control (RRC) functionality and/or radio protocol functionality, which can include Packet Data Convergence Protocol (PDCP) functionality, Radio Link Control (RLC) functionality, Medium Access Control (MAC) functionality and/or MAC scheduler functionality to support traffic (e.g., user data traffic and control traffic) for RF termination point 24. Radio protocol functionality is typically referred to as a protocol stack including a PDCP layer, an RLC layer, a MAC/MAC scheduler layer and, depending on configuration, a physical (PHY) layer.

RRM functionality is typically concerned with the allocation and maintenance of radio resources. RRC functionality is typically concerned with handling control plane signaling between an RF termination point and UEs via the Physical Downlink Control Channel (PDCCH) and/or Physical Uplink Control Channel (PUCCH) to implement RRM allocation and maintenance of radio resources through control signaling among various layers of radio protocol functionality.

In general, PDCP layer functionality can operate on E-UTRAN Radio Access Bearers (ERABs) PDCP Service Data Units (SDUs) and can generate PDCP PDUs to output to RLC layer functionality. In one embodiment, PDCP functionality can operate to apply an air crypto (e.g., encryption) and/or other addressing/control information to ERAB packets based on control signaling received from RRC layer functionality. RLC layer functionality can operate on PDCP PDUs as RLC SDUs and can generate RLC PDUs to output to MAC/MAC scheduler (e.g., legacy packet scheduler 20) layer functionality. In one embodiment, RLC layer functionality can operate to concatenate and segment higher layer PDCP PDUs into pre-derived packetized data blocks that can be passed to MAC/MAC scheduler layer functionality based on control signaling received from RRC functionality. MAC/MAC scheduler layer functionality can operate on the RLC PDUs as MAC SDUs and can generate MAC PDUs to send to PHY layer functionality containing data and/or control information or, more generally, physical resource blocks allocated to UE (e.g., RBs allocated to UE 12a-12b) across time and frequency domains. The data and control (data/control) information can be transmitted through OTA transmissions using the PDCCH, PUCCH, Physical Downlink Shared Channel (PDSCH) and/or Physical Uplink Shared Channel (PUSCH) between UE 12a-12b and RF termination point 24 according to a transmission schedule determined by the MAC/MAC scheduler layer maintained via RB allocation table 22.

In various embodiments, the VNFs that make-up RRM, RRC and radio protocol functionality of a RAN can be configured as separate instances where each vRAN slice 16.1-16.N can operate across its own set of VNFs or can be configured as a combined instance where functionality for each vRAN slice 16.1-16.N can be separated through configuration across a single set of VNFs that are shared among the slices.

CN slices 36.1-36.N can be configured to perform user data-plane operations on subscriber traffic associated with UE 12a-12b. In various embodiments, CN slices 36.1-36.N can be configured with VNFs/VNFCs/VNFCIs to perform operations associated with 3GPP Serving Gateway (SGW), Serving General Packet Radio Service (GPRS) Support Node (SGSN), Packet Data Network (PDN) Gateway (PGW) and/or Gateway GPRS Support Node (GGSN) data-plane operations. Traditionally, an SGW is a data-plane element that can provide functionality for managing user mobility and interfaces with RAN nodes (e.g., Evolved Node Bs (eNodeBs), NodeBs, Home eNodeBs (HeNBs), Home NodeBs (HNBs) or more generally, RF termination points such as RF termination point 24). An SGW can also maintain data paths between RAN nodes and one or more PGWs. A PGW typically provides IP connectivity access network (IP-CAN) session connectivity for UEs to external PDNS (PDNs) (e.g., Internet 40 and/or operator IP services). In some embodiments, SGSN functionality can be implemented to provide access for legacy UMTS network devices. For example, UE in a UTRAN or GERAN can communicate through an SGSN to an SGW and/or a PGW, which can include or be configured with functionality for a GGSN to support communications with legacy systems. In various embodiments, MME 32 can, among other operations described herein, provide for UE tracking and paging procedures including, for example, retransmissions, tracking area list management, idle mode UE tracking, and/or facilitate various UE bearer procedures including activation, deactivation and modification, SGW and PGW selection for UE and authentication services. In various embodiments, HSS 34 can be configured with subscriber policy, charging, configuration and/or other information that can enable UE 12a-12b to operate in communication system 10.

Before detailing some of the operational aspects of FIG. 1, it is important to understand some characteristics of network slicing. The following foundation is offered earnestly for teaching purposes only and, therefore should not be construed in any way to limit the broad teachings of the present disclosure. Network Slicing has historically been functionality of policy and core network elements used to deliver multiple logical networks each realizing a service as a virtually independent business operation on a common physical infrastructure. There has recently been the advent of vRAN decompositions across packet fronthaul networks in which a RAN can be separated into a Physical Network Function (PNF) (which can include of RF communication elements) and VNFs (e.g., inclusive of radio protocol stacks and control elements). Within a given decomposition between a PNF and VNFs, it is now possible to have multiple logical RAN functions, each realizing a service as a virtually independent business operation on a common physical infrastructure, deployed in a vRAN architecture.

When multiple logical RAN functions or slices of vRAN functionality are instantiated in a vRAN, there becomes a need to link each virtual instance or slice within the mobile core network to each virtual instance or slice in the vRAN in order to deliver the end-to-end service, which can be defined by the multiple logical RAN functions. Whereas conceptually this can be seen as a logical evolution of standard core-centric slicing procedures, compared with those implementations that have soft limits on resources used to support the plurality of slices (compute, storage, networking, etc. use by each slice), as slicing gets applied to RAN functionality, resources become more bounded in terms of radio resources that may include finite amounts of physical radio resource blocks (PRBs or, more generally, RBs) that need to support the multiple slices. Moreover, given options in which virtual functions can also share the radio resources, coordination is needed at the virtual function level as well as at the virtual instance level to manage RB allocation across vRAN slices.

RBs are scheduled on a subframe basis via MAC and MAC scheduler (MAC/MAC scheduler) functionality, which feeds a given PNF (e.g., RF termination point). As system bandwidth can vary for LTE architectures, such as, for example, between 1.4 megahertz (MHz) and 20 MHz, the number of available RBs that can be scheduled or allocated across UEs served by a given PNF can vary, respectively, between 6 and 100 RBs per 1 millisecond (msec) Transmission Time Interval (TTI) (e.g., 1 msec subframe) for a given transport block of RBs. Typically, a 10 MHz system carrier bandwidth corresponds to 50 available RBs that can be allocated across UEs served by a particular PNF for a particular TTI of a particular transport block. Typically, each UE served by a given PNF can be allocated a number of the RBs in a time-frequency grid. Generally, the more RBs that a UE is allocated and the higher the modulation order that is used in transmitting the RBs will result in a higher achievable bit-rate or throughput rate for the UE. Which RBs and how many each UE is allocated at a given point in time can depend upon frequency and time scheduling mechanisms for a cellular network. As referred to herein in this Specification, RBs can be generally referred to as 'resources'.

In accordance with at least one embodiment, communication system 10 may provide a system and method to facilitate managing vRAN slicing for vRAN 14. In at least one embodiment, managing can include defining and controlling vRAN 14 slicing through defining slice identities (IDs) for vRAN slices 16.1-16.N, allocating radio resources to be utilized by each vRAN slice 16.1-16.N and token bucket scheduler 18.1-18.N and mapping subscribers to particular vRAN slices. More specifically, the system and method provided by communication system 10 can provide for integrating a subscriber's subscribed Radio Access Technology (RAT)/Frequency Selection Priority (RFSP) indication maintained in the mobile core network 30 with a subscriber profile ID (SPID) maintained within the access network (e.g., vRAN 14).

During operation, a per-subscriber RFSP for UE 12a-12b can be recovered by MME 32 from HSS 34 over the S6a interface. The original, limited intent of an RFSP, as defined in 3GPP Technical Specification (TS) 25.401, 25.413, etc. was to adapt RRM processing associated with Idle and Active mode mobility. During Idle mode, RFSP can be used to define camping priorities for a UE (e.g., for a subscriber associated with the UE). During Active mode, RFSP can be used to control inter-RAT/inter-frequency handover. As defined in 3GPP TS 25.413, Section 9.2.1.86, RFSP can include an SPID Information Element (IE), which can indicate an SPID as an integer ranging from 1 to 256.

Communication system 10 can provide for enhancing the SPID from its original, limited intent to enable it to be signaled, via slice manager 28, to a given vRAN slice and a given token bucket scheduler to which a given UE is mapped. Thus, compared with previous legacy implementations in which SPID information was isolated to use in RRM operations, communication system 10 is enhanced to enable SPID (and the vRAN slice and/or token bucket scheduler instance to which it points) to be signaled between other control plane elements (e.g., MME 32, slice manager 28, RAN management system 26) and data plane elements (e.g., vRAN slices 16.1-16.N, token bucket schedulers 18.1-18.N). The RF termination point 24 (e.g., the PNF) containing at least radio functionality and, in some embodiments, PHY layer and/or other radio protocol functionality, can be a shared resource across the number of operational vRAN slices 16.1-16.N and token bucket schedulers 18.1-18.N configured for communication system 10.

Accordingly, communication system 10 can facilitate the delivery of signaling and data flow performance for UE 12a-12b across the appropriate vRAN slices 16.1-16.N and token bucket schedulers 18.1-18.N handling traffic for each of the UE thereby providing for defined end-to-end service delivery for the UE. UE to vRAN slice mapping, also referred to herein to SPID slice mapping, can be provided via slice manager 28.

RAN management system 26 can be enhanced to support vRAN slicing functionality. During operation, in at least one embodiment, slice manager 28 can operate to configure vRAN slices 16.1-16.N according to either a separate or combined instance structure, as set by a network operator and/or service provider. RAN management system 26 can provide slice manager 28 with vRAN slice mapping information that indicates a vRAN slice identity (ID) for each vRAN slice 16.1-16.N and defined radio resources allocated to each vRAN slice 16.1-16.N (signaled using SPID). In various embodiments, a vRAN slice ID can be an integer value ranging from 1 to 256.

In various embodiments, defined radio resources allocated to vRAN slices 16.1-16.N may include: a minimum number of RBs allocated to a slice, a maximum number of RBs allocated to a slice, a minimum percentage of available RBs allocated to a slice, a maximum percentage of available RBs allocated to a slice, combinations thereof or the like based on a total number of physical resource blocks that can be scheduled within a subframe across all vRAN slices 16.1-16.N. The total number of resource blocks that can be scheduled within a subframe can be determined based on the system carrier bandwidth configured for communication system 10 (e.g., 6 RBs for a 1.4 MHz bandwidth, 15 RBs for a 3 MHz bandwidth, 25 RBs for a 5 MHz bandwidth, 50 RBs for a 10 MHz bandwidth, 75 RBs for a 15 MHz bandwidth, 100 RBs for a 20 MHz bandwidth, or other number of RBs as may be defined by 3GPP standards). Slice manager 28 can signal the mapping between vRAN slice IDs and radio resources allocated to each slice to vRAN slices 16.1-16.N and token bucket schedulers 18.1-18.N. Slice manager 28 can further signal to each vRAN slice 16.1-16.N the SPID for each UE (e.g., UE 12a-12b) that are to be processed by each vRAN slice 16.1-16.N and corresponding token bucket scheduler 18.1-18.N.

RAN management system 26, in combination with MME 32 and slice manager 28 can manage subscriber to CN slice mapping across CN slices 36.1-36.N for mobile core network 30. During operation, MME 32 can signal slice manager 28 per-subscriber SPID information for UE 12a-12b. Slice manager 28 can perform per-subscriber SPID slice mapping for the SPIDs received from MME 32 to the vRAN slice IDs received from RAN management system 26; can store an association of per-subscriber SPID slice mapping using a subscriber's SPID and the corresponding vRAN slice ID to which each subscriber is mapped; and can signal each corresponding vRAN slice and respective token bucket scheduler the SPID for subscriber traffic to be handled thereby. In some embodiments, RAN management system 26 can manage subscriber to CN slice mapping in combination with an Operation Support System (OSS).

Each respective token bucket scheduler 18.1-18.N can operate to determine whether resources are available to scheduler for received S1-U data-plane traffic (e.g., packets) based on the defined radio resources allocated to each respective vRAN slice 16.1-16.N. Each respective token bucket scheduler 18.1-18.N can be configured with a 'token bucket' containing number of tokens, which can correspond to the defined radio resource allocated to each respective vRAN slice 16.1-16.N. In various embodiments, a token can represent a resource block or a number of resource blocks, a number of bytes, symbols, combinations thereof or the like that can be scheduled for a subframe.

Per-SPID/slice mapping S1-U data-plane traffic (e.g., packets) is received by each vRAN slice/token bucket scheduler and RRM, RRC and radio protocol operations can be performed on the traffic in order to enable communications between UE 12a-12b and RF termination point 24. Each token bucket scheduler can maintain a token count for its respective token bucket corresponding to the amount of resources allotted for transmissions for each subframe of radio communications between UE 12a-12b and RF termination point 24. During operation, each respective token count for each respective token bucket scheduler 18.1-18.N token bucket can be updated based on tokens removed from each respective token bucket that correspond to a number of resources needed for transmissions of one or more UE(s) and transmission (Tx) feedback received from legacy packet scheduler 20 by each respective token bucket scheduler.

In at least one embodiment, Tx feedback from legacy packet scheduler 20 can include an indication that signals to each respective token bucket scheduler 18.1-18.N when a successful transmission has occurred for a given UE so that a given token bucket scheduler can add back to its token bucket the number of tokens that had been previously removed for the given UE transmissions. In some cases, retransmissions may be needed based on Hybrid Automatic Repeat-Request (HARQ) processes controlled by legacy packet scheduler 20. LTE architectures typically employ a HARQ process controlled by a packet scheduler to detect and correct errors that may occur on the Uu interface between a UE and RF termination point. HARQ responses are typically sent from a node that is to receive a transmission back to the node from which the transmission was sent. A HARQ response can either be a Positive-Acknowledgment (ACK) or a Negative-Acknowledgment (NACK). For example, if a transmission is not decoded correctly by a receiving node (e.g., UE 12a), a Negative-Acknowledgement (NACK) can be sent from the node responsible for the transmission to stimulate a retransmission from the transmitting node. If HARQ retransmissions are needed for a given UE, the tokens removed from a token bucket (via a given token bucket scheduler) for the transmissions cannot be added back to the token bucket until a successful retransmission has occurred.

Consider an operational example involving downlink packets to be transmitted to UE 12a. Assume for the present operational example that the SPID slice mapping for UE 12a is to vRAN slice 16.1. As packets are received for UE 12a at vRAN slice 16.1, the vRAN slice can perform various RRM, RRC and radio protocol operations on the packets and the packets can be passed to token bucket scheduler 18.1. Token bucket scheduler 18.1 can operate to perform a check on the number of tokens needed to schedule resources for the downlink packets against the number of tokens available in the token bucket configured for token bucket scheduler 18.1 to determine if a sufficient number of tokens are available to schedule transmissions for UE 12a.

If a sufficient number of tokens are available in the token bucket for token bucket scheduler 18.1, a number of tokens equal to the number of resources needed to schedule UE 12a transmissions are removed from the token bucket and the packets are passed to legacy packet scheduler 20. Legacy packet scheduler 20 can schedule RBs for the downlink transmissions via legacy 3GPP packet scheduling techniques using Quality of Service (QoS) Class Indication (QCI) information, buffer status information (e.g., how empty/full radio protocol buffers are), Channel Quality Indication (CQI) information, etc. and can update RB allocation table 22 with the scheduled RBs, which can be transmitted to UE 12a via RF termination point 24 for the corresponding TTI. Adaptive modulation can be used to schedule RBs for the UE 12a transmissions. In various embodiments, adaptive modulation can relate to coding, modulation order and/or error protection, any of which can be dynamically changed for communications between RF termination point 24, under the control of legacy packet scheduler 20, and a given UE based on channel quality. In various embodiments, channel quality can be determined based on channel quality measurements and/or calculations performed by a given UE including, for example, Received Signal Received Power (RSRP), Reference Signal Received Quality (RSRQ), Received Signal Strength Indicator (RSSI), combinations thereof or the like.

For the embodiment shown in FIG. 1, legacy packet scheduler 20 and RB allocation table 22 can collectively provide legacy MAC/MAC scheduler functionality. Legacy packet scheduler 20 can perform scheduling for uplink transmissions for UE 12a-12b as well as for downlink transmissions for the UE.

If a sufficient number of tokens are not available in the token bucket for scheduler 18.1, the packets can be buffered until a sufficient number of tokens become available for scheduling transmissions for the packets. In one embodiment, the number of tokens available in a token bucket can be calculated by subtracting the number of tokens removed from the bucket from the number of tokens that correspond to the number of defined radio resources allocated to a slice. As discussed previously, tokens can be added back to a token bucket upon receiving Tx feedback indicating successful transmissions for a given UE.

Slice utilization feedback can be provided to each token bucket scheduler via RB allocation table and legacy packet scheduler 20. The slice utilization feedback can indicate the per slice RB utilization currently in use by each vRAN slice 16.1-16.N/token bucket scheduler 18-18.N. The slice utilization feedback can be used to update the number of resources allocated to each vRAN slice 16.1-16.N.

For example, if slice utilization feedback for a given vRAN slice indicates under-utilization (e.g., utilization below a given under-utilization threshold) of resources for the vRAN slice, then the token bucket scheduler for the vRAN slice can inform slice manager 28 of the under-utilization and the slice manager can perform a re-allocation of radio resources. The re-allocation of resources can include, in at least one embodiment, reducing the amount of resources allocated to the under-utilized vRAN slice and increasing the amount of resource allocated to one or more other vRAN slices. In another example, if slice utilization feedback for a given vRAN slice indicates over-utilization (e.g., utilization above a given over-utilization threshold) of resources for the vRAN slice, re-allocation of resources can be triggered for token bucket scheduler to update the resource allocation for each vRAN slice, if resources are available to re-allocate (e.g., if another vRAN slice is under-utilizing its resources.

As noted above, vRAN slices 16.1-16.N configured for vRAN 14 can be configured according to either separated instances or combined instances of VNFs to support traffic (e.g., user data traffic and control traffic) for RF termination point 24. In a separated instances configuration of vRAN slices 16.1-16.N, SPID slice mapping will define which VNFs will be allocated per UE. In a combined instances configuration of vRAN slices 16.1-16.N, SPID slice mapping will define operational functionality that will be allocated per UE for a combined set of VNFs shared across the vRAN slices 16.1-16.N.

As discussed in further detail herein, for virtualization structures in which a vRAN implementation is configured with separate radio resource scheduler instantiations per slice, a new interface can be defined between separate scheduler instances that can be used to arbitrate between possibly conflicting radio resource allocations by separate scheduler instances.

In various embodiments, RF termination point/PHY resources can be combined or segmented depending on vRAN slice configuration and resource allocation. The vRAN slice configuration will define resources available based on the RF termination point capability of resource segmentation. Depending on how RF/PHY resources are combined or segmented, coordination may be needed between VNFs at the radio protocol level based on an SPID configuration and the VNF instance structure (e.g., combined or separated).

Accordingly, communication system 10 can provide a system and method to manage vRAN slicing across a number of VNF topologies to integrate with core network slicing control using a subscriber's RFSP and SPID. Different core network slicing methods can be linked to RAN slicing using different vRAN functional decompositions by sharing SPID and slice mapping information across control- and data-plane elements of communications system 10. Various advantages can be realized through communication system 10 in various embodiments, which can include, but not be limited to providing for the delivery of network slicing across different mobile core network and vRAN architectures, which can provide for enhanced end-user experience as well as segmentation of business operations. Further, through the use of token bucket schedulers 18.1-18.N, as shown in the embodiment of FIG. 1, communication system 10 can facilitate the configuration of different vRAN slicing implementations that can be integrated with legacy packet scheduling in a manner that minimally impacts legacy packet scheduling mechanisms to enable the delivery of end-to-end service between mobile core network slices and vRAN slices.

In general, RF termination point 24 can offer any suitable over-the-air (OTA) radio access connectivity to one or more UE (e.g., UE 12a-12b) using any appropriate protocol or technique via RF communication elements configured for RF termination point 24. In various embodiments, RF communication elements can include circuitry, hardware, software, firmware, combinations thereof or the like to provide one or more radio transmitters and receivers to facilitate over-the-air radio access connectivity via RF termination point 24. Note that an 'RF termination point' (e.g., RF termination point 24) can be referred to interchangeably in this Specification as a 'cell', 'radio access point' or 'base station'. In various embodiments, RF termination point 24 can be include any subset of base station functionalities, such as for example, eNodeB functionalities, HeNB functionalities, NodeB functionalities, Radio Network Controller (RNC) functionalities, HNB functionalities, base transceiver station (BTS) functionalities, combinations thereof or the like.

It should be understood that the architecture of communication system 10 is equally applicable to small cell architectures and macro cell architectures that can be deployed within vRAN 14. Small cells (e.g., HeNBs for 4G/LTE, HNBs for 3G) operate in a similar manner to macro cells (e.g., eNodeBs for 4G/LTE, NodeBs for 3G) but typically at a lower transmission power, thereby creating smaller coverage areas in which to serve UE. Small cell networks (e.g., grids or clusters of small cells) are typically deployed in enterprise or residential environments where coverage of macro cells is limited (e.g., by walls, roofs, etc.).

In various embodiments, mobile core network 30 may additionally include one or more network elements such as, for example, one or more Policy and Charging Rules Functions (PCRFs), one or more Authentication, Authorization and Accounting (AAA) elements, a Home Location Register (HLR), etc. to provide connectivity for UE 12a-12b to one or more external PDNs, such as internet 40, to implement QoS on packet flows, to provide enhanced services to UE 12a-12b, stateful firewalls, Traffic Performance Optimization (TPO), etc.

In various embodiments, slice manager 28 can be a localized unit, a specialized unit or part of a virtualized compute node or platform that can operate in a data center or cloud server center or any other network element that may be associated with vRAN 14. Thus, various aspects of vRAN 14 may be virtualized into a cloud-based architecture to facilitate dynamic, optimized vRAN realizations for communication system 10. In various embodiments, slice manager 28 may include functionality to provide for management operations for of VNFs (e.g., vRAN slices, token bucket schedulers, legacy packet schedulers, etc.) configured for vRAN 14. In various embodiments, such management operations can include, but not be limited to, instantiation, updating, scaling and/or termination of VNFs.

In various embodiments, slice manager 28 may further include functionality to provide for slice management operations of a compute storage network (e.g., compute nodes, platforms, etc.) that may facilitate a Network Function Virtualization Infrastructure (NFVI) for vRAN 14. In various embodiments, VNFs may be implemented as virtualized software implementations (e.g., instantiations) of various RAN functionality, which may be capable of operating via NFVI. In various embodiments, NFVI can include hardware, software and/or network resources, a virtualization layer and virtualized resources. NFVI may be used to couple VNFs to underlying hardware, software and/or network resources that provide for the execution set of VNFs. In various embodiments, hardware resources can include, but not be limited to network, computing and/or storage resources. Connectivity to hardware resources can be provided via the virtualization layer, which can be implemented as one or more hypervisors or containers. In various embodiments, the virtualization layer may be used to abstract the hardware and/or software resources into virtualized resources (e.g., virtual network, virtual computing and/or virtual storage resources), which can be provided to ensure execution of instantiated sets of VNFs.

In various embodiments, slice management operations can include, but not be limited to, allocating and maintaining an inventory of hardware, software, computing, storage and/or network resources, which may be dedicated to NFVI for VNFs implemented in vRAN 14. In some embodiments, software resources can include hypervisors, which can be implemented as virtual machines (VMs) in a suitable server or other computing platform. In some embodiments, software resources can include containers, which can be implemented within an operating system or kernel in a suitable server or other computing platform. In some embodiments, network resources can include routers, switches, gateways, etc., which can be realized virtually or physically for communication system 10.

In some embodiments, slice management operations can further include the allocation of virtualization enablers, such as for example, allocating VMs onto hypervisors or allocating containers within operating systems or kernels, compute node resources, storage and/or network elements which may provide for network connectivity. In still some embodiments, slice management operations can further include managing resources to hypervisor-based or container-based virtualizations and/or resource reclamation. In still some embodiments, slice management operations can include providing for visibility into and/or management of NFVI, root cause analysis of performance issues/problems with NFVI collection of fault information and/or collection of information for capacity planning, monitoring and/or optimization of one or more dynamic vRAN implementations.

In various embodiments, UE 12a-12b can be associated with users, employees, clients, customers, etc. wishing to initiate a flow in communication system 10 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, a parking meter, an appliance, a home automation device, or any other device, component, element, or object capable of initiating voice, audio, video, media, or data exchanges within communication system 10. UE 12a-12b may also be inclusive of a suitable interface to a human user such as a microphone, a display, a keyboard, or other terminal equipment.

UE 12a-12b may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-12b may have a bundled subscription for network access and application services (e.g., voice, data), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), RADIUS, Stateless Address Auto-configuration, default bearer activation procedures, etc., or any suitable variation thereof and can include IP version 6 (IPv6) and/or IP version 4 (IPv4) IP addresses. In various embodiments, UE 12a-12b can include one or transmitters and/or receivers (e.g., transceivers) and one or more antenna(s) to facilitate over-the-air communications with one or more RF termination point 24.

Referring to FIG. 2, FIG. 2 is a simplified flow diagram illustrating example operations 200 that can be associated with managing vRAN slicing in accordance with one potential embodiment. In various embodiments, operations 200 can be performed, at least in part, via slice manager 28 and RAN management system 26.

The operations can begin at 202 in which a slice identity is configured for each of multiple vRAN slices (e.g., vRAN slices 16.1-16.N). Each vRAN slice can include some combination of RRM, RRC and radio protocol functionality, which can be virtualized or physical. At 204, the operations can include configuring an allotment of radio resources that can be utilized by each of the vRAN slices for scheduling uplink and/or downlink transmissions for UE (e.g., UE 12a-12b) connected to a vRAN RF termination point (e.g., RF termination point 24). At 206, the configured allotment of radio resources for each respective vRAN slice is communicated to each respective vRAN slice.

At 208, the operations can include slice manager 28 receiving an SPID for a subscriber from MME 32. At 210, the slice manager 28 maps the SPID for the subscriber to a particular vRAN slice that is to handle the subscriber's traffic and communicates the SPID for the subscriber to the particular vRAN slice at 212 and the operations end. In some cases, the allotment of radio resources configured for each vRAN slice can be updated based on slice utilization feedback received at each token bucket scheduler 18.1-18.N via legacy packet scheduler 20 and RB allocation table 22.

Referring to FIGS. 3A-3B, FIGS. 3A-3B are a simplified flow diagram illustrating example operations 300 that can be associated with handling subscriber traffic by a vRAN slice in accordance with one potential embodiment. For purposes of the embodiment of FIGS. 3A-3B, vRAN slice 16.1 and token bucket scheduler 18.1 are referenced; however it should be understood that any vRAN slice can perform operations as described for the embodiment of FIGS. 3A-3B.

The operations can begin at 302 in which the token bucket scheduler 18.1 determines either that a packet has been received at token bucket scheduler 18.1 from vRAN slice 16.1 for a particular UE transmission or the token bucket scheduler 18.1 determines that a buffered packet for a particular UE transmission is waiting to be scheduled. As discussed for various embodiments described herein, vRAN slice 16.1 can perform various operations on the packet including RRM operations, RRC operations and some combination of radio protocol operations, depending on the VNFs configured for vRAN slice 16.1.

At 304, token bucket scheduler 18.1 determines whether there are sufficient token(s) available in the token bucket maintained at token bucket scheduler 18.1 to allow radio resources to be schedule for the packet for a current subframe. If sufficient token(s) are not available for the current subframe, the operations continue to 306 in which the packet is buffered by token bucket scheduler 18.1 until sufficient token(s) for a subframe are available for scheduling the packet and the operations return to 302. However, if there are sufficient token(s) available in the token bucket, token bucket scheduler 18.1 removes, at 308, one or more token(s) from the token bucket that correspond to the amount of radio resources to be scheduled for the packet. In at least one embodiment, a token bucket scheduler can store an association of SPID and the number of tokens removed from its token bucket for transmissions for a given UE.

At 310, the token bucket scheduler 18.1 sends the packet to legacy packet scheduler 20. At 312, the legacy packet scheduler 20 schedules the packet for transmission by allocating a number of radio resources (e.g., RBs) to be used for the transmission. At 314, the legacy packet scheduler 20 updates a radio resource allocation table (e.g., RB allocation table 22) based on the radio resources scheduled for the transmission and, at 316, slice utilization feedback information is sent to the token bucket scheduler for the vRAN slice. In various embodiments, as discussed herein, the slice utilization feedback can be used to update the allotment of radio resources configured for each vRAN slice 16.1-16.N/token bucket scheduler 18.1-18.N.

From 316, the operations continue to 318, as shown in FIG. 3B, in which token bucket scheduler 18.1 determines whether any transmission (Tx) feedback has been received from legacy packet scheduler 20. In various embodiments, the Tx feedback to a given token bucket scheduler can include a message having a bit or flag set that indicates that a transmission was successful and a corresponding SPID or other subscriber identifier associated with the bit or flag. A token bucket scheduler can use the subscriber identifier to identify one or more token(s) that can be added back to its token bucket. In some embodiments, legacy packet scheduler 20 can provide Tx feedback for multiple subscribers in one message to a given token bucket scheduler. In other embodiments, multiple messages can be used to provide Tx feedback to a given token bucket scheduler.

If no Tx feedback has been received, the operations return to 302 shown in FIG. 3A and the token bucket scheduler 18.1 can determine again that a packet has been received at token bucket scheduler 18.1 from vRAN slice 16.1 for a UE transmission or the token bucket scheduler 18.1 can determine that a buffered packet for a UE transmission is waiting to be scheduled and the operations shown in FIGS. 3A-3B can be repeated.

However, if any Tx feedback has been received, the operations can continue to 320 in which the token bucket scheduler 18.1 identifies one or more token(s) that had previously been removed the token bucket for a packet transmission. In at least one embodiment, the token(s) can be identified based on subscriber information included in the Tx feedback. For the example operations shown in FIGS. 3A-3B, it is assumed that Tx feedback is received indicating successful transmission of the particular packet that was sent to legacy packet scheduler 20 at 310. At 322, the token bucket scheduler 18.1 adds the one or more token(s) for the particular packet back to the token bucket maintained by the token bucket scheduler 18.1. The operations can return to 302 shown in FIG. 3A and the token bucket scheduler 18.1 can determine again that a packet has been received at token bucket scheduler 18.1 from vRAN slice 16.1 for a UE transmission or the token bucket scheduler 18.1 can determine that a buffered packet for a UE transmission is waiting to be scheduled and the operations shown in FIGS. 3A-3B can be repeated.

Figure 4:
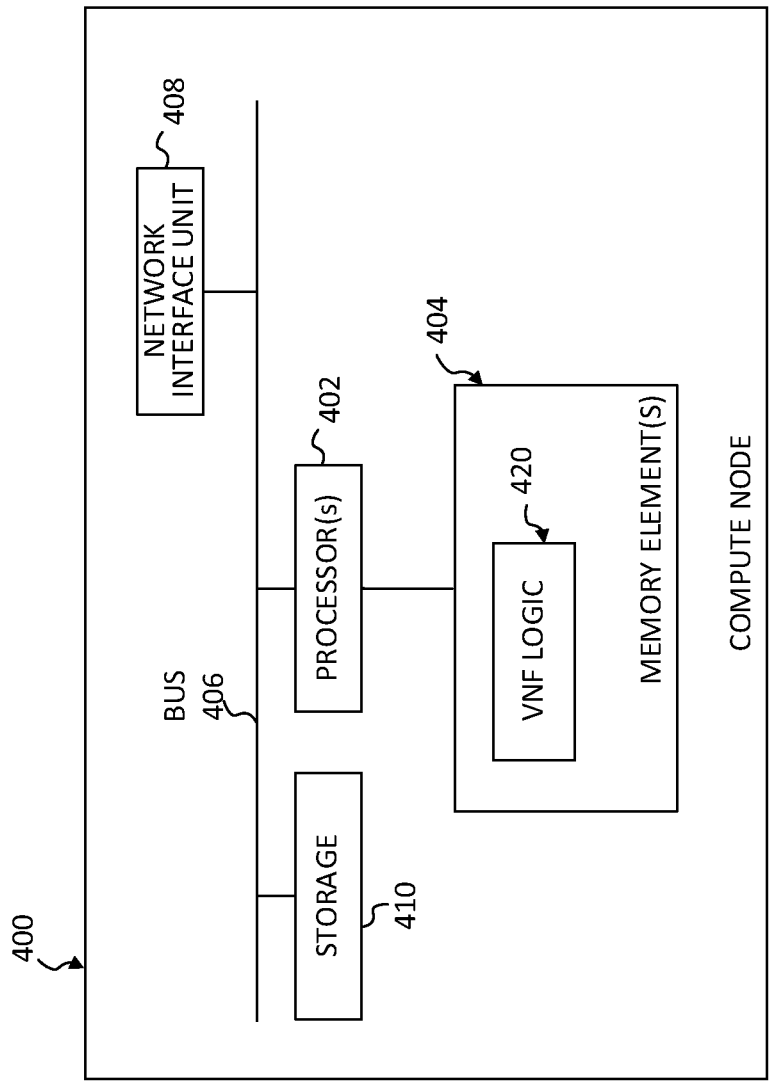
FIGS. 4-6 are simplified block diagrams illustrating example details that can be associated with various potential embodiments of the communication system of FIG. 1.

Referring to FIG. 4, FIG. 4 is a simplified block diagram illustrating example details that can be associated with a compute node 400 in accordance with various potential embodiments of communication system 10. The embodiment shown in FIG. 4 illustrates compute node 400, which includes one or more processor(s) 402, one or more memory element(s) 404, a bus 406, a network interface unit 408 and storage 410. Memory element(s) 404 can include instructions for VNF logic 420. In various embodiments, compute node 400 can be implemented: as a data center compute node such as a server, rack of servers, multiple racks of servers, etc. for a data center; as a cloud compute node, which can be distributed across one or more data centers; as combinations thereof or the like.

In various embodiments, one or more compute node(s) 400 can be used to realize virtualized functionality that may be implemented in vRAN 14. In various embodiments, processor(s) 702, memory element(s) 704, bus 706, network interface unit 708, storage 710 and logic, software, etc. configured for compute node 700 can represent hardware, software and network resources, which can be abstracted into an NFVI for vRAN 14.

In at least one embodiment, processor(s) 402 is/are at least one hardware processor configured to execute various tasks, operations and/or functions for compute node 400 as described herein according to software and/or instructions configured for compute node 400. In at least one embodiment, memory element(s) 404 is/are configured to store data, information, software and/or instructions associated with compute node 400 and logic configured for memory element(s) 404. In at least one embodiment, bus 406 can be configured as an interface that enables one or more elements of compute node 400 (e.g., network interface unit 408, processor(s) 402, memory element(s) 404 (and logic configured therein), etc. to communicate in order to exchange information and/or data among one or more elements or nodes of vRAN 14. In at least one embodiment, a fast kernel-hosted interconnect may be employed for compute node 400, potentially using shared memory between processes (e.g., VNFs), which can enable efficient communication paths between the processes. In various embodiments, network interface unit 408 enables communication between compute node 400, other compute nodes, slice manager 28, RAN management system 26, MME 32 and/or a CN slice to facilitate operations discussed for various embodiments described herein. In some embodiments, network interface unit 408 can be configured with one or more Ethernet driver(s) and/or controller(s) or other similar network interface driver(s) and/or controller(s) to enable communications for compute node 400 within communication system 10.

In various embodiments storage 410 can be configured to store data, information and/or instructions associated with compute node 400 and/or logic configured for memory element(s) 404. For example, in some embodiments, storage 410 can be configured to store SPIDs one or more subscribers, radio resource allotment information, token bucket information (e.g., a token count, etc.), slice ID information, SPID slice mapping information, combinations thereof or the like. Note that in certain examples, certain storage can be consolidated with memory elements (or vice versa), or the storage can overlap/exist in any other suitable manner.

In various embodiments, instructions for VNF logic 420 can be configured, when executed by one or more processor(s) 402, to provide one or more of: slice management functionality and SPID mapping functionality (e.g., for embodiments in which slice manager 28 is itself implemented as one or more VNFs); RRM functionality, RRC functionality, radio protocol functionality (including any combination of radio protocol functionality) for either separated or combined instance implementations of vRAN slices 16.1-16.N; token bucket scheduler functionality for implementing token bucket schedulers 18.1-18.N; legacy packet scheduler 20 and/or RB allocation table functionality; and/or any virtualized functionality that may be implemented for RF termination point 24.

Figure 5:
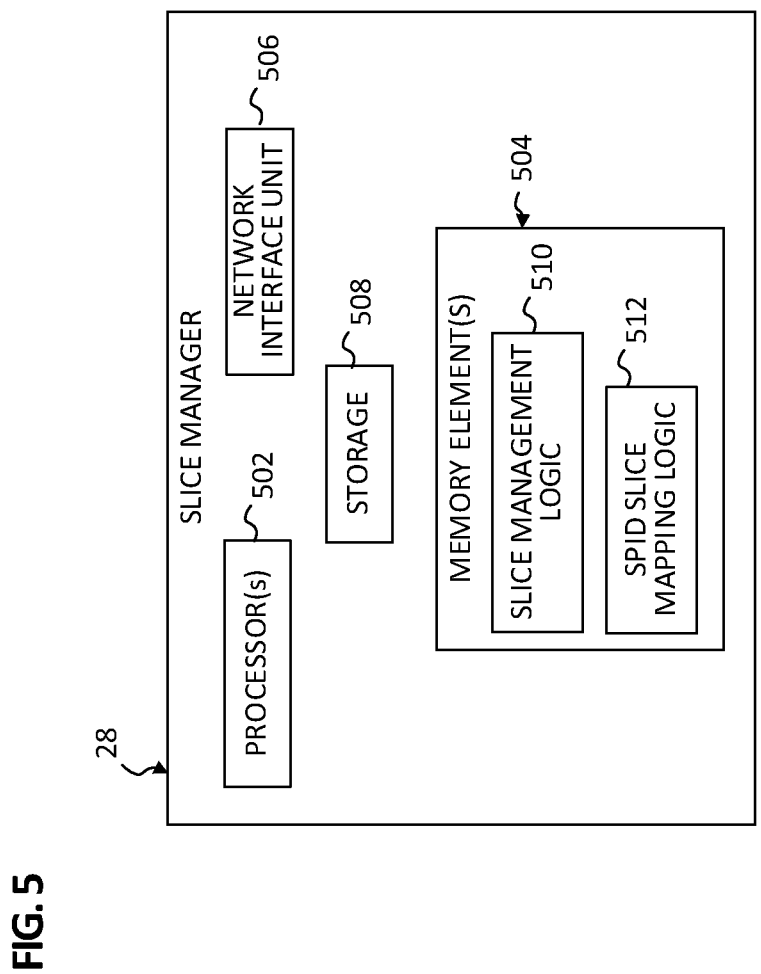

Referring to FIG. 5, FIG. 5 is a simplified block diagram illustrating example details that can be associated with slice manager 28 in accordance with at least one potential embodiment of communication system 10.

As shown in the embodiment of FIG. 5, slice manager 28 can include one or more processor(s) 502, one or more memory element(s) 504, a network interface unit 506 and storage 508. Memory element(s) 504 can include instructions for slice management logic 510 and SPID slice mapping logic 512. In various embodiments, slice manager 28 can be implemented: as a server, rack of servers, multiple racks of servers, etc. for a data center or cloud, combinations thereof or the like.

In at least one embodiment, processor(s) 502 is/are at least one hardware processor configured to execute various tasks, operations and/or functions for slice manager 28 as described herein according to software and/or instructions configured for slice manager 28. In at least one embodiment, memory element(s) 504 is/are configured to store data, information, software and/or instructions associated with slice manager 28 and logic configured for memory element(s) 504. In some embodiments, slice manager 28 can include a bus (not shown) as discussed herein. In various embodiments, network interface unit 506 enables communication between slice manager 28, MME 32, RAN management system 26, vRAN slices 16.1-16.N, token bucket schedulers 18.1-18.N and any VNFs (e.g., legacy packet scheduler 20, RB allocation table 22, etc.) that may be configured for communication system 10. In some embodiments, network interface unit 506 can be configured with one or more Ethernet driver(s) and/or controller(s) or other similar network interface driver(s) and/or controller(s) to enable communications for slice manager 28 within communication system 10.

In various embodiments storage 508 can be configured to store data, information and/or instructions associated with slice manager 28 and/or logic configured for memory element(s) 504 including, but not limited to: SPIDs one or more subscribers, radio resource allotment information for vRAN slices 16.1-16.N, slice ID information, SPID slice mapping information, combinations thereof or the like.

Slice management logic 510 can include instructions that, when executed by one or more processor(s) 502, cause slice manager 28 to configure, instantiate and/or remove one or more VNFs, vRAN slices, etc. including any NFVI associated therewith. SPID slice mapping logic can include instructions that, when executed by one or more processor(s) 502, cause slice manager 28 to map received SPID(s) for one or more subscriber(s) to a corresponding slice, to store the mapping via an association of SPID and vRAN slice ID and to communication the SPID(s) to the appropriate slice.

Figure 6:
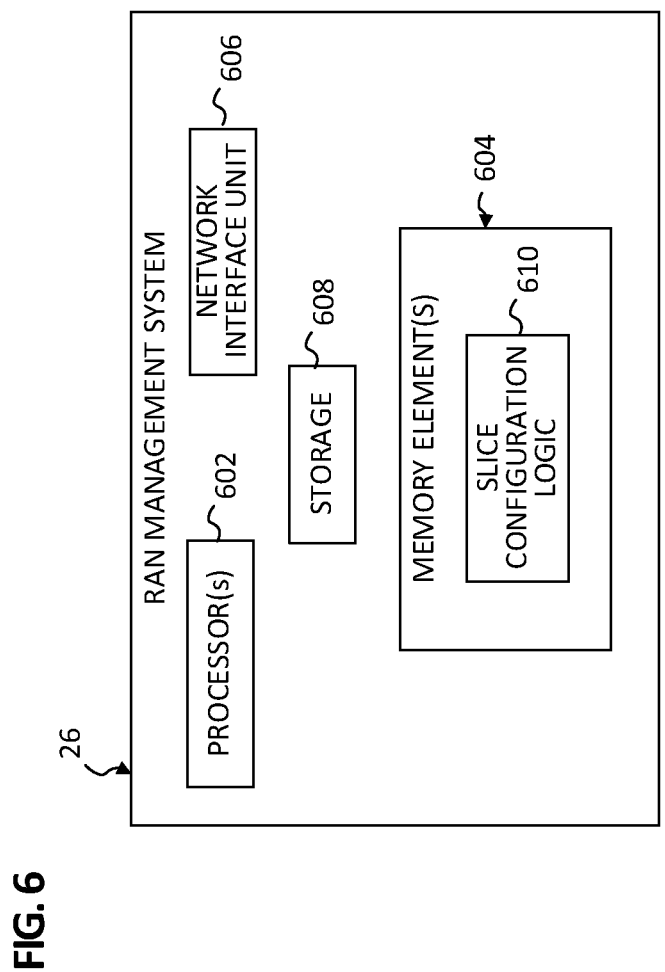

Referring to FIG. 6, FIG. 6 is a simplified block diagram illustrating example details that can be associated with RAN management system in accordance with at least one potential embodiment of communication system 10. As shown in the embodiment of FIG. 6, RAN management system 26 can include one or more processor(s) 602, one or more memory element(s) 604, a network interface unit 606 and storage 608. Memory element(s) 604 can include instructions for slice configuration logic 610. In various embodiments, RAN management system 26 can be implemented: as a server, rack of servers, multiple racks of servers, etc. for a data center or cloud, combinations thereof or the like.

In at least one embodiment, processor(s) 602 is/are at least one hardware processor configured to execute various tasks, operations and/or functions for RAN management system 26 as described herein according to software and/or instructions configured for slice manager 28. In at least one embodiment, memory element(s) 604 is/are configured to store data, information, software and/or instructions associated with RAN management system 26 and logic configured for memory element(s) 604. In some embodiments, RAN management system 26 can include a bus (not shown) as discussed herein. In various embodiments, network interface unit 606 enables communication between RAN management system 26 and slice manager 28 and/or any other elements, VNFs, etc. that may be configured for communication system 10. In some embodiments, network interface unit 606 can be configured with one or more Ethernet driver(s) and/or controller(s) or other similar network interface driver(s) and/or controller(s) to enable communications for RAN management system 26.

In various embodiments storage 608 can be configured to store data, information and/or instructions associated with RAN management system 26 and/or logic configured for memory element(s) 604 including, but not limited to: radio resource allotment information for vRAN slices 16.1-16.N, slice ID information, combinations thereof or the like.

Slice configuration logic 610 can include instructions that, when executed by one or more processor(s) 602, cause RAN management system 26 to configure a slice ID for each of one or more vRAN slices 16.1-16.N to be instantiated for vRAN 14, configure an allotment of radio resources to be utilized by each vRAN slice 16.1-16.N and each respective token bucket scheduler 18.1-18.N and/or to communication the slice IDs and/or the amount of radio resources allotted to each vRAN slice to slice manager 28.

Figure 7:
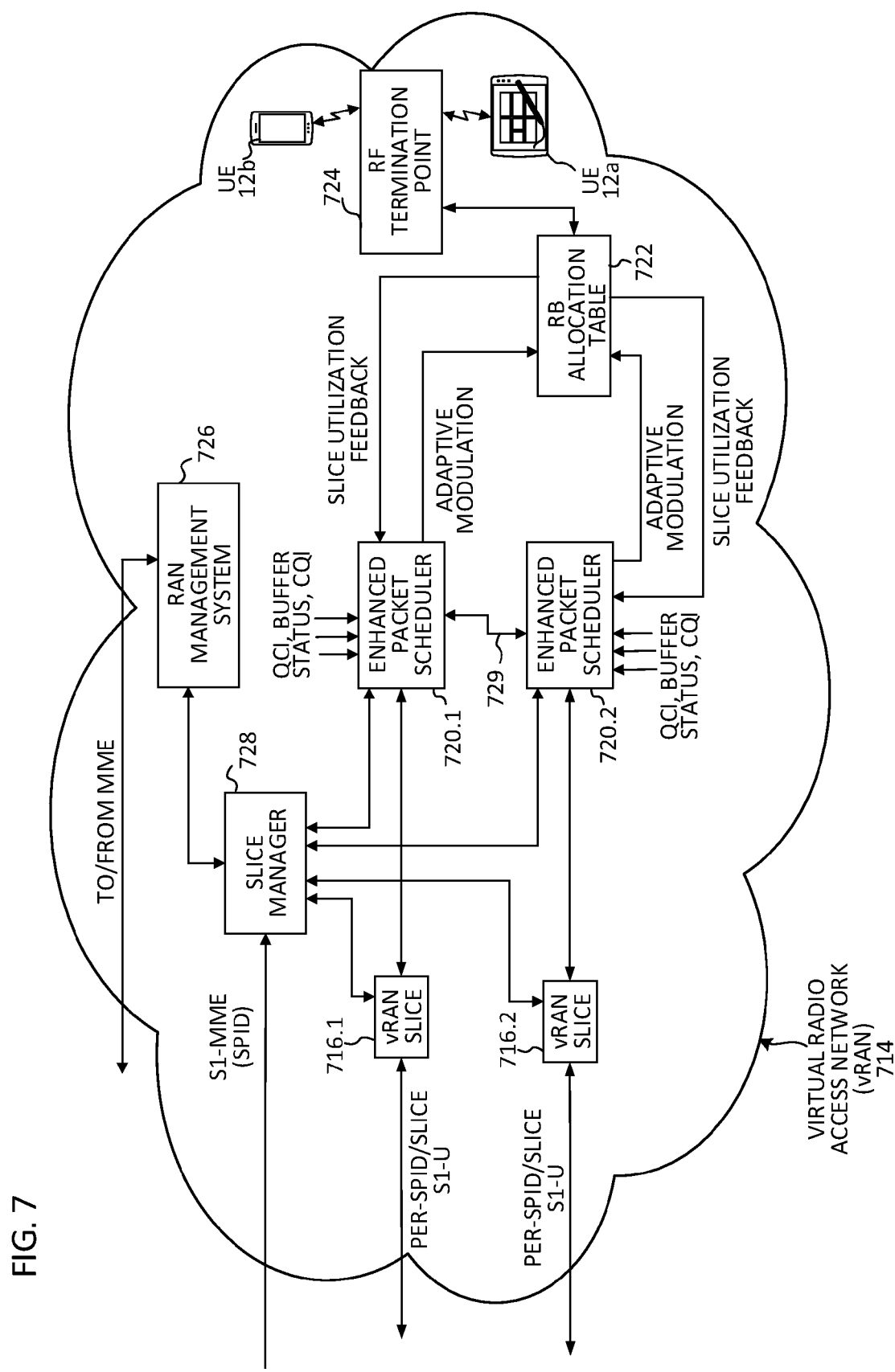
FIG. 7 is a simplified block diagram illustrating example details that can be associated with a vRAN configuration that can be implemented in accordance with one potential embodiment of the present disclosure.

Referring to FIG. 7, FIG. 7 is a simplified block diagram illustrating example details that can be associated with a vRAN 714 configuration that can be implemented in accordance with one potential embodiment of the present disclosure. In at least one embodiment, vRAN 714 can be implemented in a multi-carrier environment, in which an RF termination point is shared by multiple vRAN slices and each of one or more sets of vRAN slices are being operated by a different carrier.

As shown in FIG. 7, vRAN 714 can include users operating UE 12a-12b, vRAN slices 716.1, 716.2, enhanced packet schedulers 720.1-720.2, an RB (e.g., radio resource) allocation table 722, an RF termination point 724, a RAN management system 726, a slice manager 728 and a scheduler coordination interface 729.

Slice manager 728 and RAN management system 726 can provide operations similar to those as described for slice manager 28 and RAN management system 26, respectively, as described for FIG. 1; however, slice manager 728 may interface directly with enhanced packet schedulers 720.1-720.2 to provide SPID slice mapping information and the radio resources allocated to each vRAN slice 716.1-716.2 rather than interfacing with token bucket schedulers to provide such information. Enhanced packet schedulers 720.1-720.2 can provide operations similar to those of a legacy packet scheduler in regard to determining a time and frequency allocation of radio resources; however, the enhanced packet schedulers 720.1-720.2 can be additionally configured to interface with each other via scheduler coordination interface 729.

During operation, enhanced packet schedulers 720.1-720.2 can exchange signaling between each other that can be used to arbitrate between possibly conflicting radio resources so that duplicative radio resources are not allocated by each enhanced packet scheduler 720.1-720.2. The signaling between enhanced packet schedulers 720.1-720.2 can provide coordination between the schedulers that enables vRAN slices 716.1-716.2 to collaborate on resource usage for the most optimal operation within the parameters of the defined resource allocation for each vRAN slice.

Slice utilization feedback can be sent to each enhanced packet scheduler 720.1-720.2 to update the allocation of radio resources configured for each vRAN slice 716.1-716.2 and corresponding enhanced packet scheduler 720.1-720.2, if needed, using techniques as discussed for various embodiments described herein.

In regards to the internal structure associated with communication system 10, any compute node, network element, agent, and/or manager, management system, etc. can be configured to include a respective at least one processor, a respective at least one memory element in accordance with various embodiments. In addition, in some embodiments, storage can be configured for any such node, element, agent and/or manager. Hence, appropriate software, hardware and/or algorithms are being provisioned for communications system 10 in order to facilitate operations as described for various embodiments discussed herein to facilitate managing vRAN slicing.

In one example implementation, compute nodes, network elements, agents, managers and/or management systems can encompass network appliances, servers, routers, switches, gateways, bridges, loadbalancers, firewalls, processors, modules, or any other suitable device, component, element, or object operable to exchange information that facilitates or otherwise helps to facilitate various operations as described for various embodiments discussed herein in a network environment (e.g., for networks such as those illustrated in FIGS. 1 and 7, etc.). Alternatively, one or more of the compute nodes, elements, etc. discussed herein can include software (or reciprocating software) that can coordinate in order to achieve operations associated with managing vRAN slices in a network environment, as outlined herein. In still other embodiments, one or more of the compute nodes, network elements, etc. may include any suitable algorithms, hardware, software, components, modules, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, the compute nodes, network elements, managers, management systems, etc. discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to the compute nodes, network elements, etc. discussed herein could be provided in any database, register, control list, cache, and/or storage structure: all of which can be referenced at any suitable timeframe. Any such storage options may be included within the broad term 'memory element' as used herein. Similarly, any of the potential processing nodes, elements, modules, controllers, managers, management systems, logic and/or machines described herein should be construed as being encompassed within the broad term 'processor'. Each of the compute nodes, network elements, managers, etc. discussed herein can also include suitable interfaces for receiving, transmitting, and/or otherwise communicating data or information in a network environment.

Note that in certain example implementations, operations as outlined herein may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element [as shown in FIGS. 4-6] can store data used for operations described herein. This includes memory elements being able to store software, logic, code, and/or processor instructions that are executed to carry out operations described herein. A processor (e.g., a hardware processor) can execute any type of instructions associated with data to achieve the operations detailed herein. In one example, a processor [as shown in FIGS. 4-6] could transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 10 may be applicable to other exchanges or routing protocols, interfaces and/or communications standards, proprietary and/or non-proprietary. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
configuring, by a slice manager in a virtual radio access network (vRAN), a slice identity for each of a plurality of vRAN slices, wherein each vRAN slice comprises functionality to perform, at least in part, one or more radio protocol operations on subscriber traffic;
configuring an allotment of radio resources that can be utilized by each vRAN slice of the plurality of vRAN slices;
receiving, by the slice manager, a subscriber profile identity (SPID) for a subscriber from a core network function in a core network, wherein the subscriber is subscribed to a radio access technology/frequency selection priority (RFSP) indication maintained in the core network;
mapping the SPID for the subscriber to a particular vRAN slice of the plurality of vRAN slices, wherein the mapping associates the SPID in the vRAN slice with the RFSP indication in a core network slice; and
integrating the core network slice and the vRAN slice into a network slice by providing, using the association between the SPID in the vRAN slice and the RFSP indication, the SPID to a plurality of control-plane elements and data-plane elements in the vRAN slice and one or more control-plane elements in the core network, wherein network elements in the integrated network slice use the SPID, the configured allotment of radio resources, and the association between the SPID in the vRAN slice and the RFSP indication to perform the one or more radio protocol operations on the subscriber traffic.

2. The method of claim 1, further comprising:
communicating the mapping for the subscriber to the particular vRAN slice to which the SPID is mapped.

3. The method of claim 1, further comprising:
communicating the allotment of radio resources that can be utilized by the particular vRAN slice to the particular vRAN slice.

4. The method of claim 1, further comprising:
storing, by the slice manager, an association of the SPID for the subscriber with the slice identity for the particular vRAN slice based on the mapping.

5. The method of claim 1, wherein configuring the allotment of radio resources that can be utilized by each vRAN slice of the plurality of vRAN slices includes:
determining a total number of physical resource blocks that can be scheduled within a subframe; and
configuring an amount of physical resource blocks that can be scheduled by each vRAN slice of the plurality of vRAN slices based on the total number of physical resource blocks that can be scheduled within a subframe.

6. The method of claim 5, wherein the total number of physical resource blocks that can be scheduled within a subframe can be associated with at least one of:
downlink transmissions for one or more subscribers; and
uplink transmissions for one or more subscribers.

7. The method of claim 1, further comprising:
configuring a token bucket for each vRAN slice of the plurality of vRAN slices, wherein each token bucket for each vRAN slice is configured with a number of tokens that is based on the allotment of radio resources configured for each vRAN slice; and
maintaining for each vRAN slice a token count representing a number radio resources allocated to subscriber traffic operated on by each vRAN slice.

8. The method of claim 7, further comprising:
receiving, by at least one vRAN slice, utilization feedback information indicating an amount of radio resources utilized by the at least one vRAN slice in relation to a total number of radio resources that can be utilized by the plurality of vRAN slices for a subframe.

9. The method of claim 8, further comprising:
updating, for the at least one vRAN slice, the number of tokens of the token bucket configured for the vRAN slice based on the utilization feedback information received by the at least one vRAN slice.

10. The method of claim 1, the one or more radio protocol operations include at least one of:
one or more Packet Data Convergence Protocol (PDCP) operations;
one or more Radio Link Control (RLC) operations; and
one or more Medium Access Control (MAC) operations.

11. The method of claim 1, wherein each vRAN slice of the plurality of vRAN slices further comprises functionality to perform Radio Resource Control (RRC) operations on subscriber traffic.

12. One or more non-transitory tangible media encoding logic that includes instructions for execution that when executed by a processor, is operable to perform operations comprising:
configuring, by a slice manager in a virtual radio access network (vRAN), a slice identity for each of a plurality of vRAN slices, wherein each vRAN slice comprises functionality to perform, at least in part, one or more radio protocol operations on subscriber traffic;
configuring an allotment of radio resources that can be utilized by each vRAN slice of the plurality of vRAN slices;
receiving, by the slice manager, a subscriber profile identity (SPID) for a subscriber from a core network function in a core network, wherein the subscriber is subscribed to a radio access technology/frequency selection priority (RFSP) indication maintained in the core network;
mapping the SPID for the subscriber to a particular vRAN slice of the plurality of vRAN slices, wherein the mapping associates the SPID in the vRAN slice with the RFSP indication in a core network slice; and
integrating the core network slice and the vRAN slice into a network slice by providing, using the association between the SPID in the vRAN slice and the RFSP indication, the SPID to a plurality of control-plane elements and data-plane elements in the vRAN slice and one or more control-plane elements in the core network, wherein network elements in the integrated network slice use the SPID, the configured allotment of radio resources, and the association between the SPID in the vRAN slice and the RFSP indication to perform the one or more radio protocol operations on the subscriber traffic.

13. The media of claim 12, the operations further comprising:
communicating the mapping for the subscriber to the particular vRAN slice to which the SPID is mapped.

14. The media of claim 12, the operations further comprising:
communicating the allotment of radio resources that can be utilized by the particular vRAN slice to the particular vRAN slice.

15. The media of claim 12, wherein configuring the allotment of radio resources that can be utilized by each vRAN slice of the plurality of vRAN slices further comprises:
determining a total number of physical resource blocks that can be scheduled within a subframe; and
configuring an amount of physical resource blocks that can be scheduled by each vRAN slice of the plurality of vRAN slices based on the total number of physical resource blocks that can be scheduled within a subframe.

16. The media of claim 12, the operations further comprising:
configuring a token bucket for each vRAN slice of the plurality of vRAN slices, wherein each token bucket for each vRAN slice is configured with a number of tokens that is based on the allotment of radio resources configured for each vRAN slice; and
maintaining, for each vRAN slice, a token count representing a number radio resources allocated to subscriber traffic operated on by each vRAN slice.

17. A system, comprising:
a memory element for storing data; and
a processor to execute instructions associated with the data that, when executed, the system is configured to:
configure, by a slice manager in a virtual radio access network (vRAN), a slice identity for each of a plurality of vRAN slices, wherein each vRAN slice comprises functionality to perform, at least in part, one or more radio protocol operations on subscriber traffic;
configure an allotment of radio resources that can be utilized by each vRAN slice of the plurality of vRAN slices;
receive, by the slice manager, a subscriber profile identity (SPID) for a subscriber from a core network function in a core network, wherein the subscriber is subscribed to a radio access technology/frequency selection priority (RFSP) indication maintained in the core network;
map the SPID for the subscriber to a particular vRAN slice of the plurality of vRAN slices, wherein the mapping associates the SPID in the vRAN slice with the RFSP indication in a core network slice; and
integrate the core network slice and the vRAN slice into a network slice by providing, using the association between the SPID in the vRAN slice and the RFSP indication, the SPID to a plurality of control-plane elements and data-plane elements in the vRAN slice and one or more control-plane elements in the core network, wherein network elements in the integrated network slice use the SPID, the configured allotment of radio resources, and the association between the SPID in the vRAN slice and the RFSP indication to perform the one or more radio protocol operations on the subscriber traffic.

18. The system of claim 17, wherein the system is further configured to:
communicate the mapping for the subscriber to the particular vRAN slice to which the SPID is mapped.

19. The system of claim 17, wherein the system is further configured to:
communicate the allotment of radio resources that can be utilized by the particular vRAN slice to the particular vRAN slice.

20. The system of claim 17, wherein the system is further configured to:
configure a token bucket for each vRAN slice of the plurality of vRAN slices, wherein each token bucket for each vRAN slice is configured with a number of tokens that is based on the allotment of radio resources configured for each vRAN slice; and
maintain, for each vRAN slice, a token count representing a number radio resources allocated to subscriber traffic operated on by each vRAN slice.

* * * * *

UNITED STATES PATENT AND TRADEMARK OFFICE
CERTIFICATE OF CORRECTION

PATENT NO. : 10,498,659 B2
APPLICATION NO. : 15/203609
DATED : December 3, 2019
INVENTOR(S) : Oliver James Bull et al.

Page 1 of 1

It is certified that error appears in the above-identified patent and that said Letters Patent is hereby corrected as shown below:

In the Specification

In Column 2, Line 31, after "number" insert -- of --.

In the Claims

In Column 23, Line 23, in Claim 7, after "number" insert -- of --.

In Column 24, Line 41, in Claim 16, after "number" insert -- of --.

In Column 25, Line 26, in Claim 20, after "number" insert -- of --.

Signed and Sealed this
Twelfth Day of May, 2020

Andrei Iancu
*Director of the United States Patent and Trademark Office*